United States Patent [19]

Koo

[11] Patent Number: 6,006,337
[45] Date of Patent: Dec. 21, 1999

[54] COMPUTER SYSTEM FOR PLAYING AN AUDIO COMPACT DISK AND A PLAYING METHOD THEREOF

[75] Inventor: Ja-Goun Koo, Seoul, Rep. of Korea

[73] Assignee: SamSung Electronics Co., Ltd., Kyungki-do, Rep. of Korea

[21] Appl. No.: 08/969,618

[22] Filed: Nov. 13, 1997

[30] Foreign Application Priority Data

Nov. 13, 1996 [KR] Rep. of Korea ................ 96-53731

[51] Int. Cl.$^6$ ................................................ G06F 1/32
[52] U.S. Cl. ........................................ 713/324; 713/320
[58] Field of Search ............... 395/750.06; 713/300–340

[56] References Cited

U.S. PATENT DOCUMENTS

| | | |
|---|---|---|
| 4,747,041 | 5/1988 | Engel et al. . |
| 5,504,908 | 4/1996 | Ikeda . |
| 5,511,203 | 4/1996 | Wisor et al. . |
| 5,521,854 | 5/1996 | Kadowaki . |
| 5,617,571 | 4/1997 | Tanaka . |
| 5,634,798 | 6/1997 | Suh . |
| 5,838,983 | 11/1998 | Atkinson ........................ 395/750.06 |

Primary Examiner—Ayaz R. Sheikh
Assistant Examiner—David A. Wiley
Attorney, Agent, or Firm—Robert E. Bushnell, Esq.

[57] ABSTRACT

A computer system is selectively powered up so as to plays only an audio compact disk contained therein under the condition that the main power for the entire computer system remains turned-off. The computer system includes: a keypad having a plurality of keys for producing control signals; a microcontroller for producing PMS-control signals and compact disk-control signals according to the control signals of the keypad; a power supply for receiving AC power and for producing the main power for the entire computer or for producing the compact disk-power according to the PMS-control signals; a compact disk drive for receiving the compact disk-power, and for reading a compact disk contained therein, and for outputting audio signals according to the compact disk-control signals.

8 Claims, 6 Drawing Sheets

FIG.6

COMPUTER SYSTEM FOR PLAYING AN AUDIO COMPACT DISK AND A PLAYING METHOD THEREOF

CLAIM OF PRIORITY

This application makes reference to, incorporates the same herein, and claims all benefits accruing under 35 U.S.C. § 119 from an application for A COMPUTER SYSTEM FOR PLAYING AN AUDIO COMPACT DISK AND A PLAYING METHOD THEREOF earlier filed in the Korean Industrial Property Office on the day of the month of Nov. 13$^{th}$ 1996 and there duly assigned Ser. No. 53731/1996.

BACKGROUND OF THE INVENTION

1. Field of the Invention

The present invention relates to a process and computer system for playing an audio compact disk (CD) and, more particularly, to a process and computer system for selectively powering up the system to play an audio compact disk under the condition that the main power for the entire computer system remains turned-off.

2. Description of the Related Art

Generally, a computer which has a compact disk driver (CDD) and a video board for playing motion pictures is known as a multimedia computer. Nowadays, almost all of the computers on the market have the compact disk drive for reading or playing a compact disk-title, an MPEG (Motion Picture Experts Group) video compact disk and an audio compact disk. In the conventional computer system, main power must be supplied to the entire computer system for driving the compact disk drive therein and playing an audio compact disk. Exemplars of typical designs of computer systems and process able to play audio compact disks may be found in such recently issued references as U.S. Pat. No. 5,634,798 to Suh, entitled Compact Disk Player-Incorporated Television Receiver Having A Monitor Power Control Function, U.S. Pat. No. 5,521,854 to Kadowaki et al., entitled Power-Saving Control For A control Unit In A Computer System, U.S. Pat. No. 5,504,908 to Ikeda, entitled Power Saving Control System For Computer System, U.S. Pat. No. 5,617,571 to Tanaka, entitled Method For Controlling Power To Individual Audio-Video Units Making Up An Audio-Video System, U.S. Pat. No. 4,747,041 to Engel et al., entitled Automatic Power Control System Which Automatically Activates And Deactivates Power To Selected Peripheral Devices Based Upon System Requirement, and U.S. Pat. No. 5,511,203 to Wisor et al., entitled Power Management System Distinguishing Between Primary And Secondary System Activity.

Earlier computer systems for playing audio compact disks typically used a system bus, a central processing unit, a random access memory, a read only memory, a video controller, an input/output controller, an IDE controller, an hard disk drive, a compact disk drive, an audio card, speakers, a microcontroller and a switching mode power supply. The system bus interfaces data, commands and interrupt signals among the various devices of the computer system. The I/O controller is connected to the system bus and controls signal input/output operations of the variable peripheral devices such as floppy disk drives, serial ports, parallel ports, and infrared ports. The IDE controller is connected to the system bus controls signal input/output of the hard disk drive and compact disk drive. The hard disk drive and compact disk drive are controlled to read or write data thereon by the IDE controller. Conventionally, the IDE controller is a device for interfacing disk drivers with a computer. In a computer system using the IDE controller, additional boards for interfacing the drivers and the computer are not required since the disk drivers contain disk driver control circuits therein. The audio card receives and manipulates the audio signal from the compact disk drive. The speaker outputs voice signals upon receiving the audio signals. The microcontroller outputs PMS control signals for controlling the power supply according to the control signals generated from the keyboard and the mouse or according to software stored therein. The power supply receives AC power and supplies main power to the entire computer system according to the PMS control signals.

The compact disk drive related parts of the earlier computer system for playing an audio compact disk comprises the power supply for supplying main power to the entire computer system. The power supply is turned on by the operation of a switch. The computer system further includes the compact disk drive. The audio card receives and manipulates the audio signals from the compact disk drive and speakers output voice signals upon receiving the audio signals from the audio card. In operation, a user turns on the power supply by pressing the switch to play an audio compact disk. Then, the main power is supplied to the entire computer system. After supplying the main power, a software for playing an audio compact disk is operated by the user and the compact disk drive outputs the audio signals according to the control signals of the IDE controller. Then, the audio card receives and manipulates the audio signals and the speakers output voice signals upon receiving the audio signals.

I have noticed that in the designs for these earlier systems, the compact disk drive can be operated after supplying the main power to the entire computer system and after executing an operating system for the computer and a software program for playing the audio compact disk. In addition, the microcontroller can not control the switching mode power supply in such a manner that only the compact disk drive can be operated. Therefore, even when the user want to play only the audio compact disk in the computer system, the entire computer system must be turned-on. Thus, approximately 100 Watts of power are needed to play the audio compact disk in the computer system. Namely, many devices which are unnecessary for playing the audio compact disk must be operated. Therefore, if a device of the computer system has malfunctioned, the user can not play the audio compact disk. In addition, it takes a great deal of time to start the compact disk drive since the operating system for the computer must be executed before playing the audio compact disk. Furthermore, the audio quality of the audio compact disk is deteriorated due to the noise generated by the operation of various cooling fans for the CPU and SMPS.

SUMMARY OF THE INVENTION

Accordingly, it is a primary object of this invention to provide and improved process and apparatus for driving compact disks.

It is another object to provide a process and computer system for playing an audio compact disk without also operating unnecessary peripheral devices in the computer system.

It is yet another object to provide a process and computer system for playing an audio compact disk with reduced power consumption.

It is still another object to provide a process and computer system for playing an audio compact disk, in which the audio compact disk can be easily and instantly played.

It is a further object to provide a process and computer system for playing an audio compact disk in which noise arising from the unnecessary devices are eliminated.

To these ends, according to one embodiment of this invention, a computer system is provided for playing an audio compact disk, with a switch for determining whether main power or compact disk-power is to be supplied to the computer system; a power supply for receiving AC power, and for producing the main power for each devices of the computer or for producing the CD-power according to the state of the switch; a compact disk drive controller for receiving the CD-power, and for outputting control signals; and a compact disk drive for receiving the CD-power, and for operating according to the control signal.

According to another embodiment of this invention, a computer system is provided for playing an audio compact disk with a keypad having a plurality of keys for producing control signals; a microcontroller for producing PMS-control signals and CD-control signals according to the control signals of the keypad; a power supply for receiving AC power and for producing a main power for each device of the computer or for producing a CD-power according to the PMS-control signal; a compact disk drive for receiving the CD-power, the compact disk drive reading a compact disk contained therein, and outputting audio signals according to the CD-control signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will become apparent from a study of the following detailed description with reference to the accompanying drawings.

Figure 5:
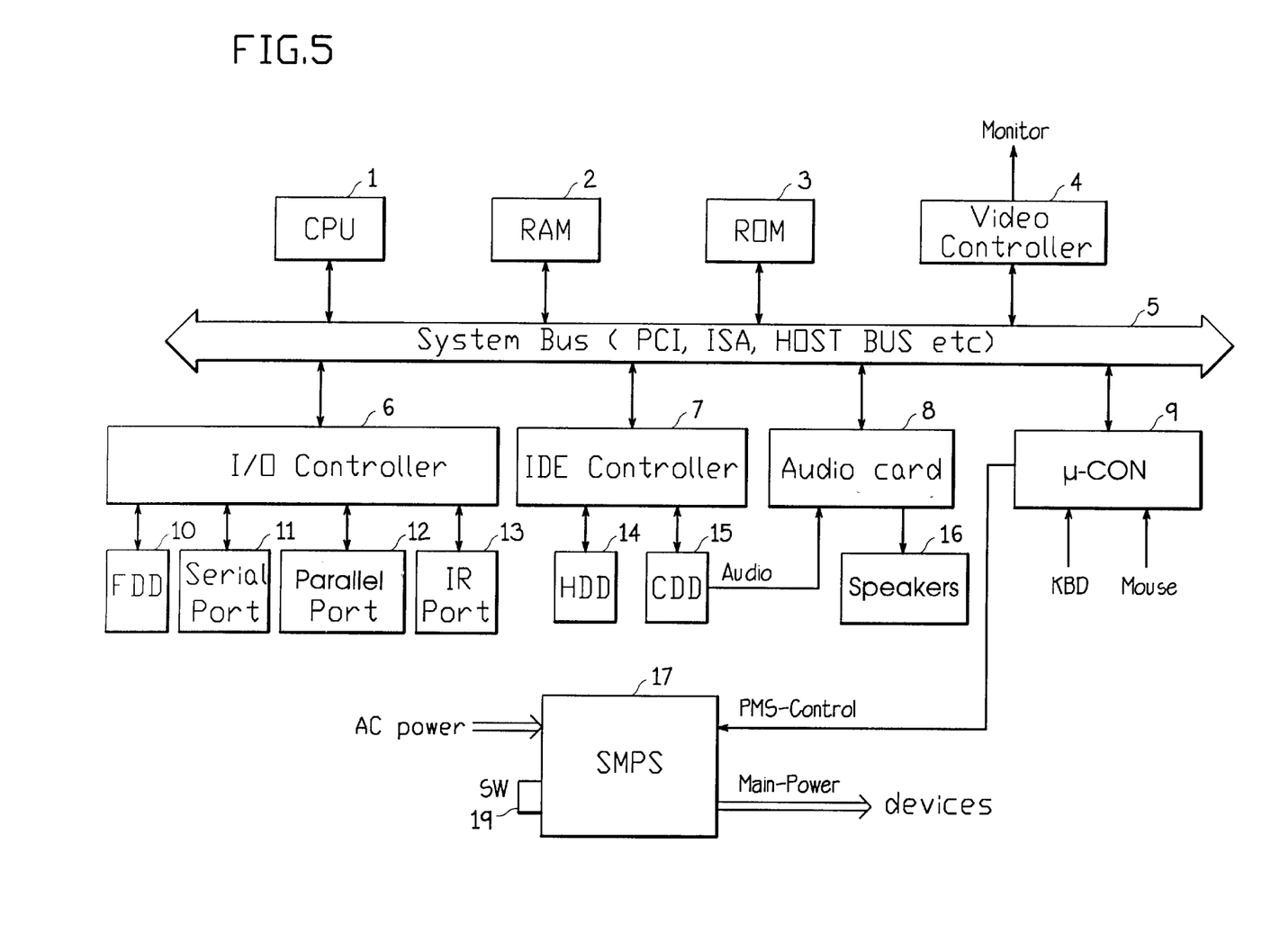
FIG. 5 is a block diagram of an earlier computer system for driving an audio compact disk.

Referring first to FIG. 5, an earlier computer system for playing an audio compact disk comprises a system bus 5, a central processing unit (CPU) 1, a random access memory (RAM) 2, a read only memory (ROM) 3, a video controller 4, an Input/Output(I/O) controller 6, an integrated device electronics (IDE) controller 7, a hard disk driver(HDD) 14, a compact disk drive 15, an audio card 8, speakers 16, a micro controller 9 and a switching mode power supply (SMPS) 17. The system bus 5 interfaces data, commands and interrupt signals among the various devices of the computer system. The I/O controller 6 is connected to the system bus 5 and controls signal input/output operations of the various peripheral devices such as floppy disk drives (FDD) 10, serial ports 11, parallel ports 12 and IR(infrared) ports 13. The IDE controller 7 which is connected to the system bus 5 controls signal input/output of the hard disk driver (HDD) 14 and the compact disk driver (CDD) 15. The hard disk drive 14 and the compact disk drive 15 are controlled to read or write data thereon by the IDE controller 7.

Conventionally, the IDE controller 7 is a device for interfacing disk drivers with a computer. In a computer system using the IDE controller, additional boards for interfacing the drivers and the computer are not required since the disk drivers contains disk driver control circuits therein. The audio card 8 receives and manipulates the audio signal AUDIO from the compact disk drive 15. The speaker 16 outputs voice signals upon receiving the audio signals. The microcontroller 9 outputs PMS-control signals for controlling the SMPS 17 according to the control signals generated from the keyboard and the mouse or according to a software stored therein. The switching mode power supply(SMPS) 17 receives AC power and supplies main power to the entire computer system according to the PMS-control signals.

Figure 6:
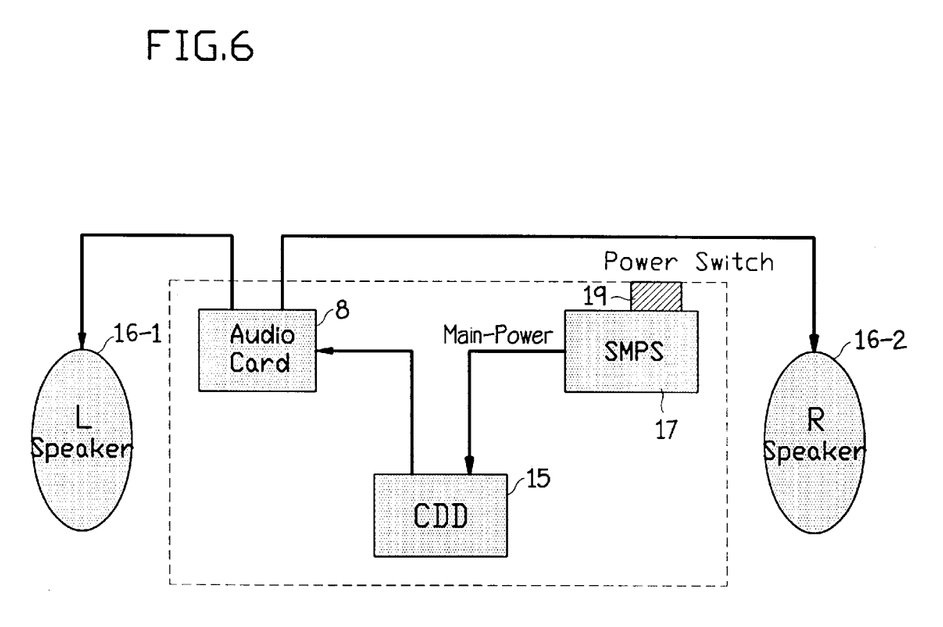
FIG. 6 is a schematic block diagram of an earlier computer system for driving an audio compact disk.

Referring to FIG. 6, the compact disk drive related parts of the earlier computer system will be described as follows. The earlier computer system for playing an audio compact disk comprises the switching mode power supply(SMPS) 17 for supplying main power to the entire computer system. The switching mode power supply(SMPS) 17 is turned on by the operation of the switch 19. The computer system further includes the compact disk drive 15. The audio card 8 receives and manipulates the audio signals from the compact disk drive 15. The speakers 16-1 and 16-2 output voice signals upon receiving the audio signals from the audio card 8.

In operation, a user turns on the switching mode power supply(SMPS) 17 by pressing the switch 19 to play an audio compact disk. Then the main power is supplied to the entire computer system. After supplying the main power, a software for playing an audio compact disk is operated by the user, and the compact disk drive 15 outputs the audio signals according to the control signals of the IDE controller 7. Then the audio card 8 receives and manipulates the audio signals, and the speakers 16-1 and 16-2 output voice signals upon receiving the audio signals.

Figure 1:
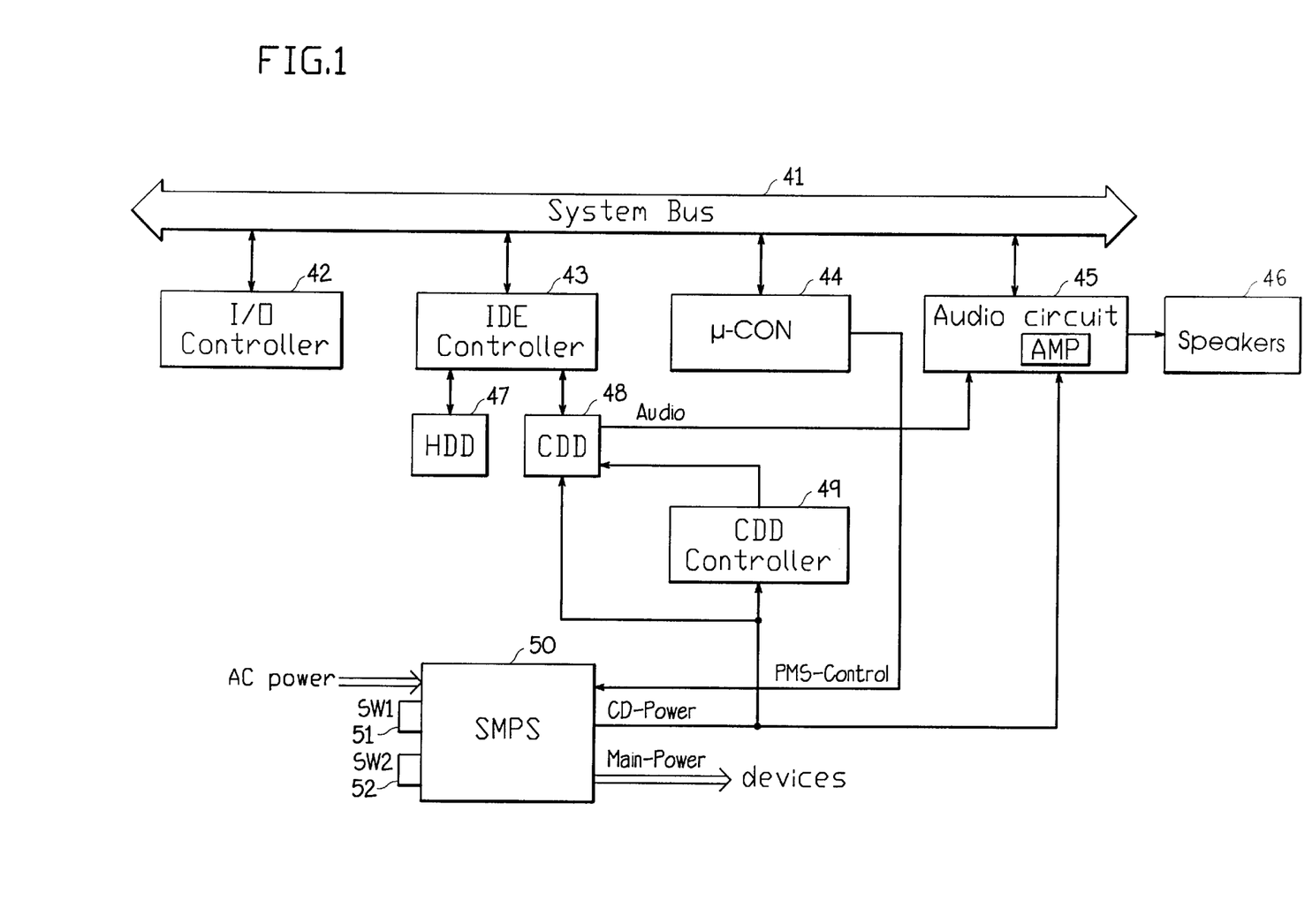
FIG. 1 is a block diagram of a computer system for driving an audio compact disk constructed as a first embodiment of this invention.

As shown in FIG. 1, a computer system for driving an audio compact disk driver in accordance with the first embodiment of the present invention comprises a system bus 41, an Input/Output(I/O) controller 42, an integrated device electronics (IDE) controller 43, a hard disk driver(HDD) 47, a microcontroller 44, a first switch 51, a second switch 52, a switching mode power supply(SMPS) 50, a compact disk drive controller 49, a compact disk drive 48, an audio circuit 45 and speakers 46.

Figure 2:
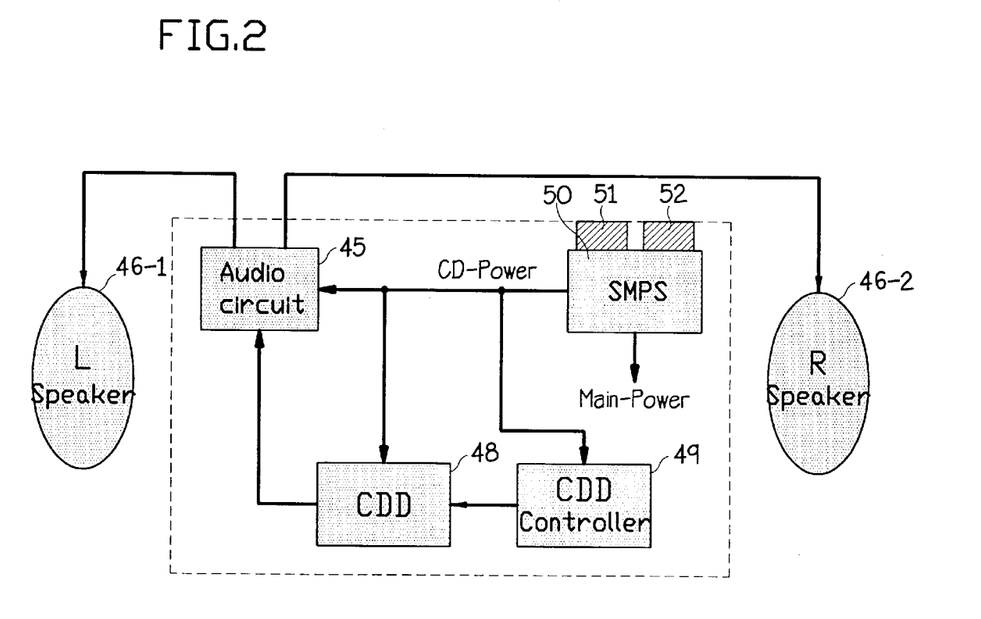
FIG. 2 is a schematic block diagram of a computer system for driving an audio compact disk in accordance with the first embodiment of this invention.

A more detailed schematic diagram of the first embodiment is shown in FIG. 2. As shown in FIG. 2, the compact disk drive related part of the computer system for driving an audio compact disk in accordance with the first embodiment of the present invention comprises the first and second switches 51 and 52, the power supply 50, the compact disk drive controller 49, the compact disk drive 48, the audio circuit 45 and the speakers 46-1 and 46-2.

The operation of a computer system for driving an audio compact disk driver in accordance with the first embodiment of the present invention is as follows. Referring to FIG. 1, the computer system includes the system bus 41 and the I/O controller 42. The system bus 41 transfers data, commands and interrupt signals among the various devices of the computer, and the I/O controller 42 which is connected to the system bus 41 controls signal input/output operations of the various peripheral devices such as floppy disk drives, serial ports, parallel ports and IR(infrared) ports. The IDE controller 43 which is connected to the system bus 41 controls signal input/output of the hard disk driver 47 and the compact disk driver 48. Conventionally, the IDE controller 43 is a device for interfacing disk drivers and a computer. In a computer system using the IDE controller, additional boards for interfacing the drivers and the computer is not required since the disk drivers contains disk driver control circuits therein.

The microcontroller 44 is connected to the system bus 44, and produces PMS-control signals (power-on signal) upon receiving control signals from the keyboard or mouse. Whether a main power or a CD-power is supplied to the computer system is determined according to the state of the second switch 52. When the first switch 51 is turned on or upon receiving the PMS-control signal, the power supply 50 which receives AC power produces a main power for each devices of computer or produces CD-power according to the state of the second switch 52.

The CD-power is supplied to the compact disk drive controller 49, the compact disk drive 48 and the audio circuit 45 so that the devices 45, 48, 49 can be normally operated. The compact disk drive controller 49 controls the compact disk drive 48 so that the compact disk drive 48 reads a compact disk therein and produces audio signals AUDIO the audio circuit 45. The audio circuit 45 receives the audio signals AUDIO. Then, an amplifier AMP in the audio circuit 45 amplifies the audio signals AUDIO and outputs the amplified audio signals AUDIO to speakers 46.

Referring to FIG. 2, the power supply 50 supplies a main power or a CD-power according to the state of the second switch 52. If the CD-power is selected, the power supply 50 produces CD-power under the condition that the main power for the entire computer system is not supplied. The CD-power is supplied to the compact disk drive controller 49, and the compact disk drive controller 49 controls the compact disk drive 48. Thus, the compact disk drive 48 can be played, stopped and operates as a normal compact disk player. The audio signals AUDIO produced by the compact disk drive 48 are amplified by the audio circuit 45. In the earlier computer system, the audio signals AUDIO are outputted to an audio card of the computer system for manipulation of the audio signals, but in this embodiment, a separate audio circuit 45 having an amplifier is preferably provided for amplifying the audio signals AUDIO. However, the conventional audio card also can be used instead of the audio circuit 45. A microcontroller can be used as the compact disk drive controller 49 for controlling the compact disk drive 48, and the microcontroller can be incorporated into the compact disk drive 48. The audio circuit 45 amplifies the audio signals AUDIO, and the speaker 46-1 and 46-2 receive the amplified audio signals AUDIO and outputs voice signals according to the audio signals AUDIO. By turning off the CD-power and turning on the main power, a user can operate the entire computer system. When the computer system is normally operated, the speakers 46-1 and 46-2 can receive the audio signals AUDIO from the conventional audio card (not shown). In the conventional computer system, the power must be supplied to the entire computer system to play the compact disk drive 48. But, in this invention, the compact disk drive 48 can be played by supplying the CD-power only to the compact disk drive controller 49, the compact disk drive 48 and the audio circuit 45.

Figure 3:
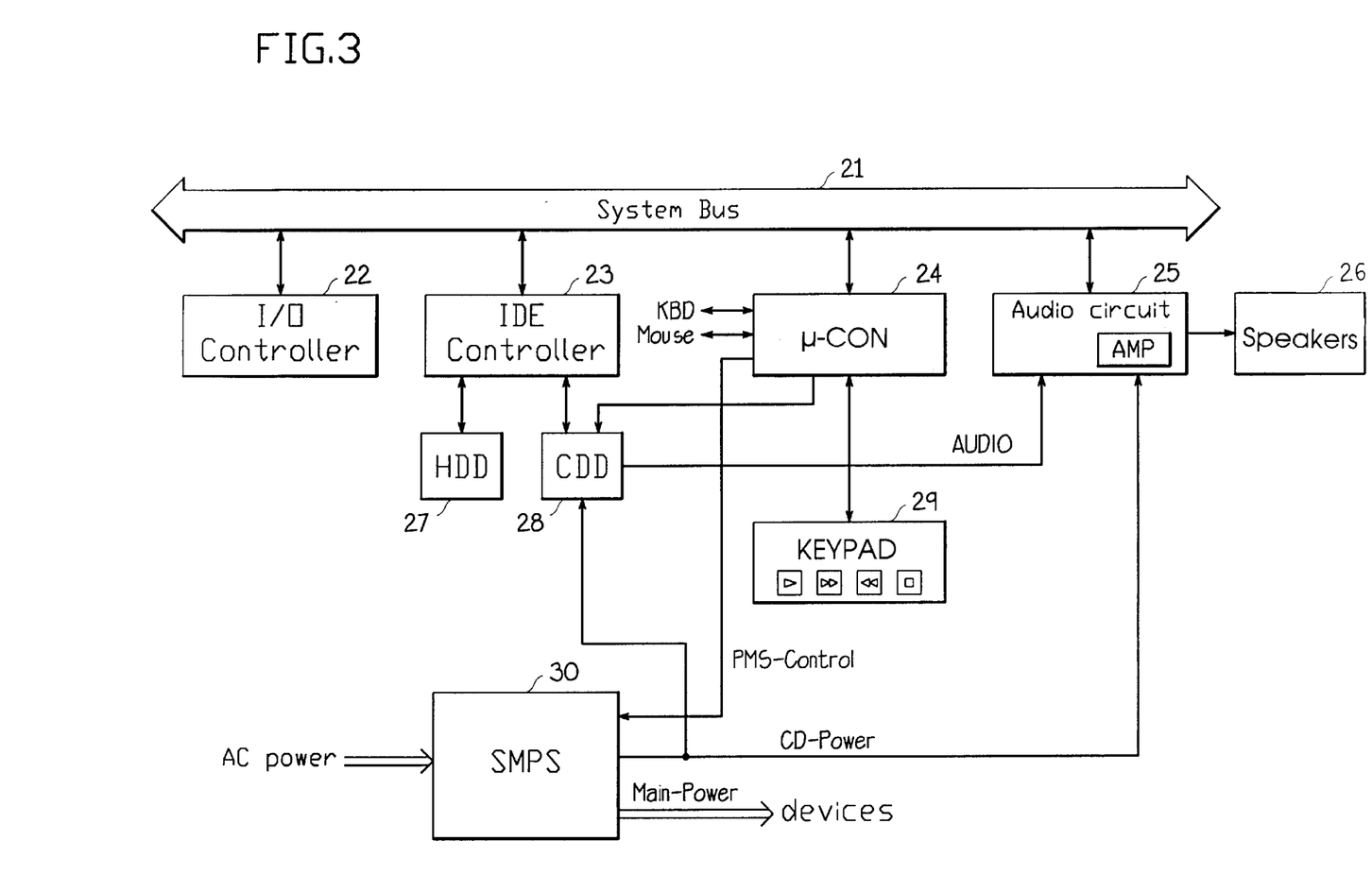
FIG. 3 is a block diagram of a computer system for driving an audio compact disk constructed as a second embodiment of this invention.

FIG. 3 is a block diagram of the computer system for driving an audio compact disk according to the second embodiment. As shown in FIG. 3, a computer system for driving an audio compact disk driver in accordance with the second embodiment of the present invention comprises a keypad 29, a system bus 21, an input/output(I/O) controller 22, an integrated device electronics (IDE) controller 23, a hard disk driver(HDD) 27, a microcontroller 24, a switching mode power supply(SMPS) 30, a compact disk drive 28, an audio circuit 25 and speakers 46.

The operation of a computer system for driving an audio compact disk driver in accordance with the second embodiment of the present invention is as follows. In this embodiment, a keypad is used as an input device. Referring to FIG. 3, the computer system includes the system bus 21, the I/O controller 22 and the IDE controller 23. The functions thereof have been previously explained with reference FIG. 1. The microcontroller 24 is connected to the system bus 24, and produces PMS-control signals upon receiving control signals from a keypad 29. The keypad 29 scans the user's key inputs, and outputs signals according to the key input. The power supply 30 which receives AC power produces a main power for each device of the computer or produces CD-power according to the PMS-control signals.

The CD-power is supplied to the compact disk drive 28 and the audio circuit 25 so that the devices 25 and 28 can be normally operated. The microcontroller 24 also controls the compact disk drive 28 upon receiving control signals from the keypad 29 so that the compact disk drive 28 reads a compact disk therein and produces and outputs audio signals AUDIO to the audio circuit 25. The audio circuit 25 receives the audio signals AUDIO. Then, an amplifier AMP in the audio circuit 25 amplifies the audio signals AUDIO and outputs the audio signals AUDIO to the speakers 26.

Figure 4:
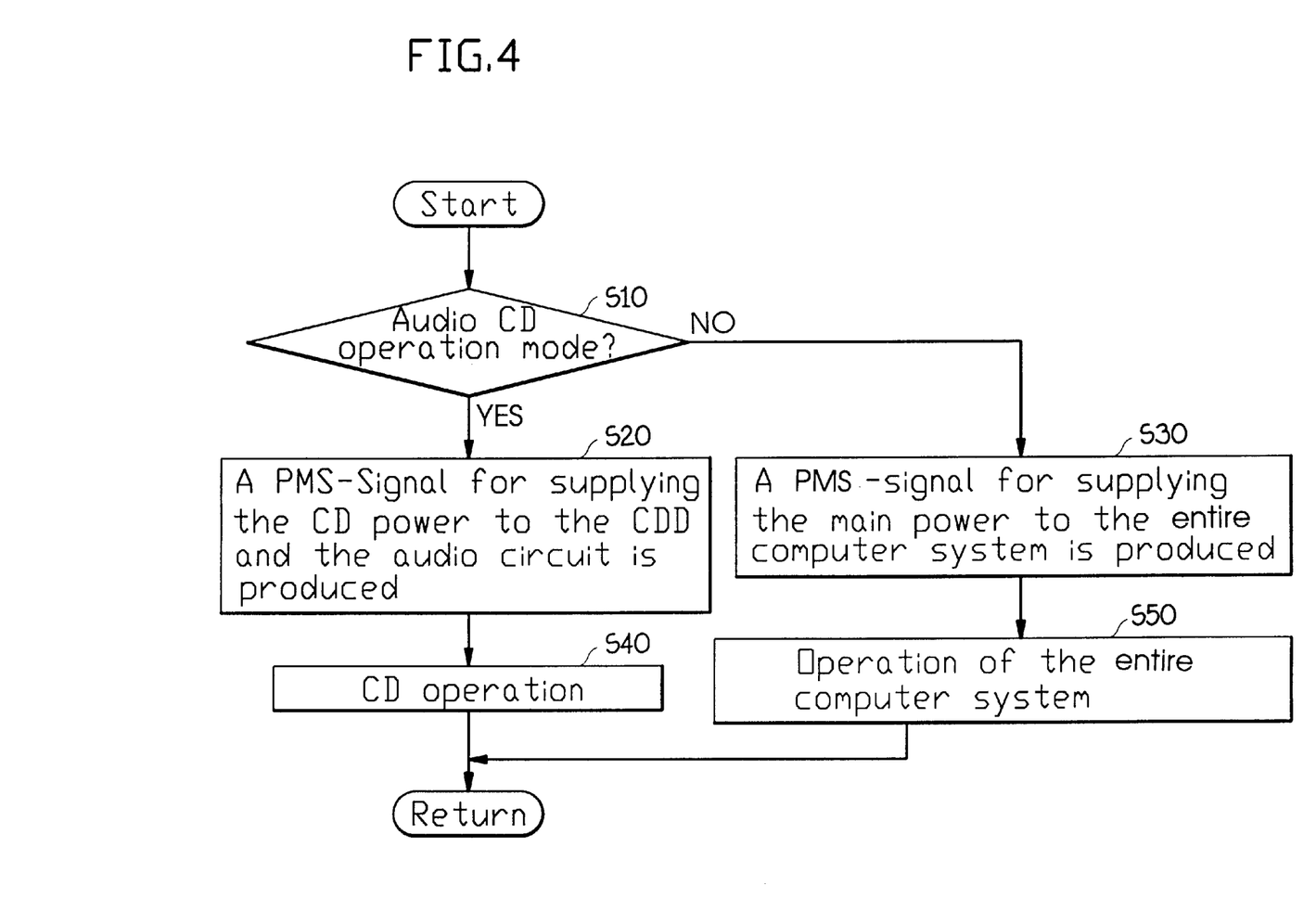
FIG. 4. is a flowchart which illustrates the driving method of the computer system for driving an audio compact disk in accordance with the second embodiment of this invention.

FIG. 4 is a flowchart which illustrates the driving method of the computer system for driving an audio compact disk in accordance with the second embodiment of this invention. As shown in FIG. 4, the first step of running the computer system for driving an audio compact disk is a step of determining whether the entire computer system or only the compact disk drive should be operated(S10). If the compact disk drive should be played (that is, the audio compact disk operation mode), a PMS-signal which controls power supply so as to supply the CD-power to the compact disk drive 28 and the audio circuit 25 is produced(S20). Then the compact disk drive is operated with the CD-power(S40). Briefly, after determining whether the entire computer system or compact disk drive must be operated, if only the compact disk drive should be played, the compact disk drive is played according to the input signal of the keypad 29. If the entire computer system must be operated, a PMS-control signal which controls the power supply so as to supply the main power to the entire computer system is produced(S30). Then the entire computer system Is normally operated.

Therefore, one can play only the audio compact disk using the keypad without supplying main power to the entire computer system. Thus, the compact disk can be played more easily and the power consumption can be reduced to 10–20% with compared to the power consumption of operation of the entire computer system.

What is claimed is:

1. A computer system for driving an audio compact disk driver, the computer system comprising:

a switch for determining whether a main power or a compact disk-power is to be supplied to the computer system upon the computer system initially being off;

a power supply for receiving AC power, and for producing the main power for the entire computer system or for producing the compact disk-power according to the state of the switch;

a compact disk drive controller for receiving the compact disk-power, and for outputting compact disk-control signals; and a compact disk drive for receiving the compact disk-power, and for reading a compact disk contained therein, and for outputting audio signals according to the compact disk-control signals.

2. A computer system according to claim 1, further comprising an audio circuit for receiving the compact disk-power and the audio signals from the compact disk drive and for amplifying the audio signals.

3. A computer system according to claim 2, further comprising speakers for outputting voice signals upon receiving the amplified audio signals.

4. A computer system according to claim 1, the compact disk drive controller being physically incorporated into the compact disk drive.

5. A computer system for driving an audio compact disk driver, the computer system comprising:

a keypad having a plurality of keys for producing control signals for commanding power to be selectively supplied to portions of the computer system upon the computer system initially being off;

a microcontroller for producing PMS-control signals and compact disk-control signals according to the control signals of the keypad;

a power supply for receiving AC power and for producing a main power for the entire computer or for producing a compact disk-power according to the PMS-control signal;

a compact disk drive for receiving the compact disk-power, and for reading a compact disk contained therein, and for outputting audio signals according to the compact disk-control signals.

6. A computer system according to claim 5, further comprising an audio circuit for receiving the compact disk-power and the audio signals from the compact disk drive and for amplifying the audio signals.

7. A computer system according to claim 6, further comprising speakers for outputting voice signals upon receiving the amplified audio signals.

8. A method of driving a compact disk driver in a computer system, the method comprising the steps of:

determining whether the entire computer system or only a compact disk driver is to be turned on upon the computer system initially being off;

producing a first PMS-signal if only the compact disk drive is to be turned on;

controlling a power supply with the first PMS-signal so as to supply the compact disk-power to the compact disk driver for the operation of the compact disk driver;

producing a second PMS-signal if the entire computer system is to be turned on; and controlling the power supply with the second PMS-signal so as to supply the main-power to the entire computer system for the operation of the entire computer system.

* * * * *